Dec. 29, 1931.  J. E. THORNTON  1,839,132
CINEMATOGRAPH SPOOLCASE
Filed Jan. 26, 1927
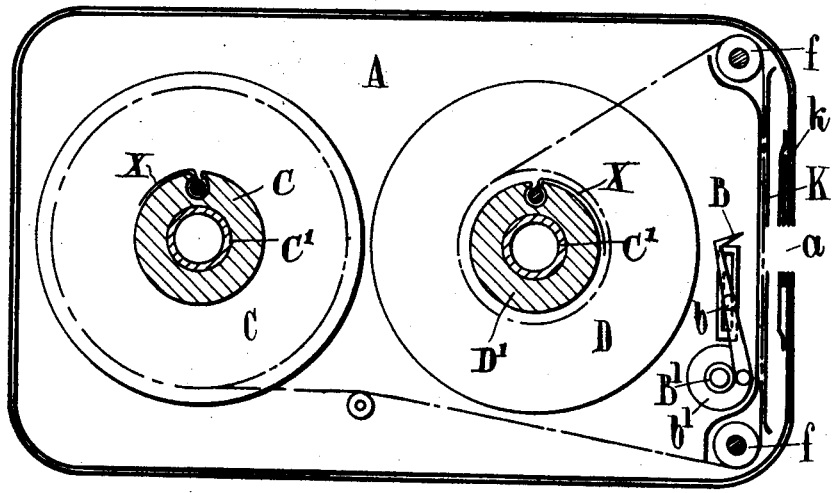
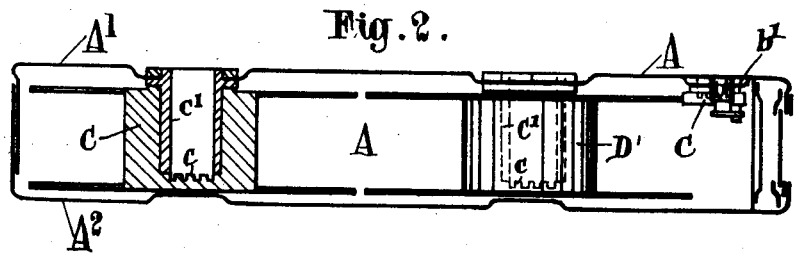
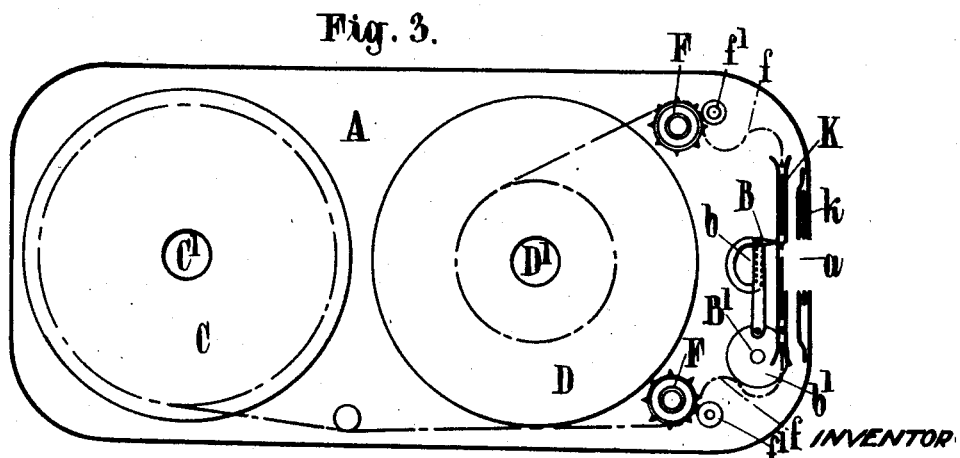

Patented Dec. 29, 1931

1,839,132

UNITED STATES PATENT OFFICE

JOHN EDWARD THORNTON, OF WEST HAMPSTEAD, LONDON, ENGLAND, ASSIGNOR TO JOHN OWDEN O'BRIEN, OF MANCHESTER, ENGLAND

CINEMATOGRAPH SPOOLCASE

Application filed January 26, 1927, Serial No. 163,805, and in Great Britain February 18, 1926.

This invention relates to improvements in spoolcases for cinematograph film apparatus.

The object of the invention is to produce a spoolcase which may be inserted on to the usual spindles for driving the drum and spool of a cinematograph camera or projector whereby the film is permanently protected within the casing of the spoolcase and needs no threading through the camera or projector. The drum and spool are rotated by mechanism on the camera or projector, such mechanism forming no part of the present invention.

The invention consists of a detachable spoolcase comprising in combination with a casing of a drum upon which the film is wound, a hollow spindle passing through one side of the casing upon which the drum is mounted, a spool arranged in line with the drum upon which the film is wound after exposure, a second hollow spindle passing through the side of the casing upon which the spool is mounted, a spool arranged in line with the drum upon which the film is wound after exposure, a second hollow spindle passing through the side of the casing upon which the spool is mounted, a leader strip permanently affixed at one end to the drum and at the other end to the forward end of the film, a second leader strip permanently affixed at one end to the spool and at the other end to the rear end of the film, a second leader strip permanently affixed at one end to the spool and at the other end to the rear end of the film, mechanism within the casing for intermittently feeding the film forward past an aperture in the casing, a closure member for the aperture, and a hollow shaft passing through the casing by which the intermittent feed mechanism is driven.

The invention will be described with reference to the accompanying drawings in which:—

Fig. 1 is a sectional elevation of one form of the spoolcase particularly applicable for use in a camera in which the spools are of comparatively small diameter and light weight and the film is drawn directly and intermittently from the supply-spool by the claw-motion, which serves the double purpose of film-feed and film-shift.

Fig. 2 is a transverse section of same.

Fig. 3 is a sectional elevation of a similar form of the spoolcase particularly applicable for use in a camera in which the film is continuously fed and moved by a pair of small continuously-rotating sprockets, is formed into loops, and is intermittently shifted by the claw-feed.

In the form of the invention shown in Figs. 1 and 2 the film feeding and measuring intermittently reciprocating claw B and the spring-operated plates K forming the spring gate and brake are placed at the front of the spoolcase A adjacent to the aperture $a$ with the supply-spool C and receiving-wheel D behind them.

The spoolcase is constructed in two parts $A^1$, $A^2$ which fit over one another like a box and lid (see Fig. 2) stamped or drawn from thin sheet aluminium.

The reciprocating claw B is mounted on a slide $b$ and is driven by a continuously rotating wheel $b^1$ mounted on a hollow shaft $B^1$ which passes through the wall of the case A. Crown teeth $c^2$ provide a driving connection between the hollow shaft $B^1$ and a projecting spindle on the camera or projector. Two small idle rollers $f$ guide the film to and from the gate.

The spools C and D and the shaft $B^1$ carrying the rotating wheel $b^1$ are carried in the case or in a separate frame arranged therein.

The shaft $B^1$ and the cores $C^1$, $D^1$ of the spools C and D are hollow so as to fit on to projecting spindles in the camera or projector and be driven thereby. Crown teeth $c$ pins and slots or other suitable devices are provided to form a driving connection between the hollow shafts or sleeves on the spoolcase and the projecting spindles on the camera or projector.

The synchronization of the gearing between the three projecting spindles driving respectively the drum, the spool and the intermittent feed mechanism is provided in the camera or projector and is not part of the spoolcase.

A slide or shutter $k$ is arranged at the front of the exposure aperture *a* in the case A so that the latter can be closed when the spoolcase is not in position in the camera.

The spoolcase shown in Fig. 3 is similar to that shown in Figs. 1 and 2 but is provided with two continuously rotating sprockets F driven through suitable gearing from the shaft $B^1$ carrying the wheel *b* reciprocating the claw B.

The slide for the claw B is preferably of D shape as such shape gives a quicker movement and a longer dwell to the film. Then two sprockets F feed the film from and to the spools C and D and the film describes loops or slack *f* between the sprockets F and the spring gate K. The pull, strain or load of the two spools C and D is therefore taken by these two continuous sprockets, and the only load upon the claw-movement is the total weight of the small amount of film in the loop between the two sprockets F.

Idle rollers $f^1$ are provided to keep the film in engagement with the sprockets.

Leader-strips

The leader-strips by which the film is attached to the spool and reel may be of the ordinary type made of paper or film, but I prefer to use those of the unbreakable type of very strong construction, for example a double thickness of linen tape, or a double thickness of paper with a linen tape insertion, the three layers being cemented together, or a double thickness of strong parchmentized paper cemented together.

There are two such leader-strips of long length, one attached to each end of the film, one leader being attached by its other end to the spool and one to the reel. The effect of this arrangment is to permanently connect spool and reel so that either one or the other can be used to give motion to the film-strip; the spool, reel, two leaders, and one film forming a single connected movable unit.

The exposure-opening in the narrow wall of the case is covered by a sliding or other form of closure member *k* (see Figs. 1 to 3) which covers and protects the sensitive film, but which is withdrawn after the spoolcase has been inserted in the camera before exposure. After exposure the shutter is reclosed before removing the spoolcase from the camera. It may slide endways or crossways.

What I claim as my invention and desire to protect by Letters Patent is:—

A detachable spoolcase for use in cinematograph film apparatus comprising in combination with a casing of a drum upon which the film is wound, a recessed hub upon which the drum is mounted, a hollow sleeve affixed to the casing upon which the hub rotates, crown gearing within the recess in the hub by which said drum is rotated by a projecting spindle on the cinematograph apparatus to enter the recessed hub for driving the drum, a spool arranged in line with the drum upon which the film is wound after exposure, a recessed hub upon which the drum is mounted, a hollow sleeve affixed to the casing upon which the spool rotates, crown gearing within the recess in the hub by which said spool is rotated by a projecting spindle on the cinematograph apparatus to enter the recessed hub for driving the spool, a leader strip permanently affixed at one end to the drum and at the other end to the forward end of the film, a second leader strip permanently affixed at one end to the spool and at the other end to the rear end of the film, claw mechanism within the casing for intermittently feeding the film forward past an aperture in the casing, a closure member for the aperture, a hollow shaft provided in the casing and gearing with the intermittent feed mechanism, crown gearing within the shaft by which it is rotated and a third projecting spindle on the cinematograph apparatus to enter the hollow shaft for driving the intermittent feed mechanism, the three spindles projecting from the cinematograph apparatus being driven in unison.

In testimony whereof I have hereunto set my hand.

JOHN EDWARD THORNTON.